Patented Mar. 20, 1923.

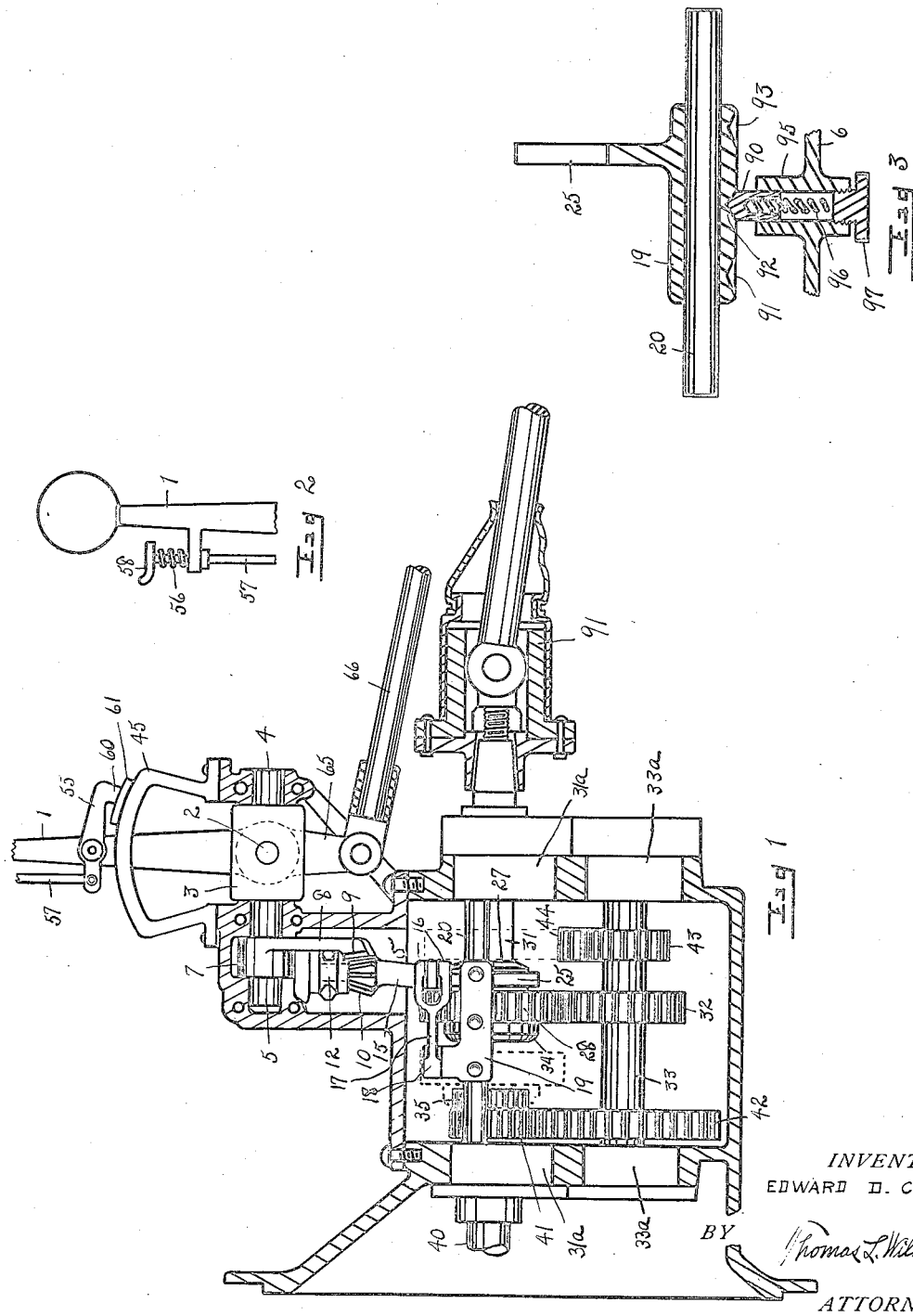

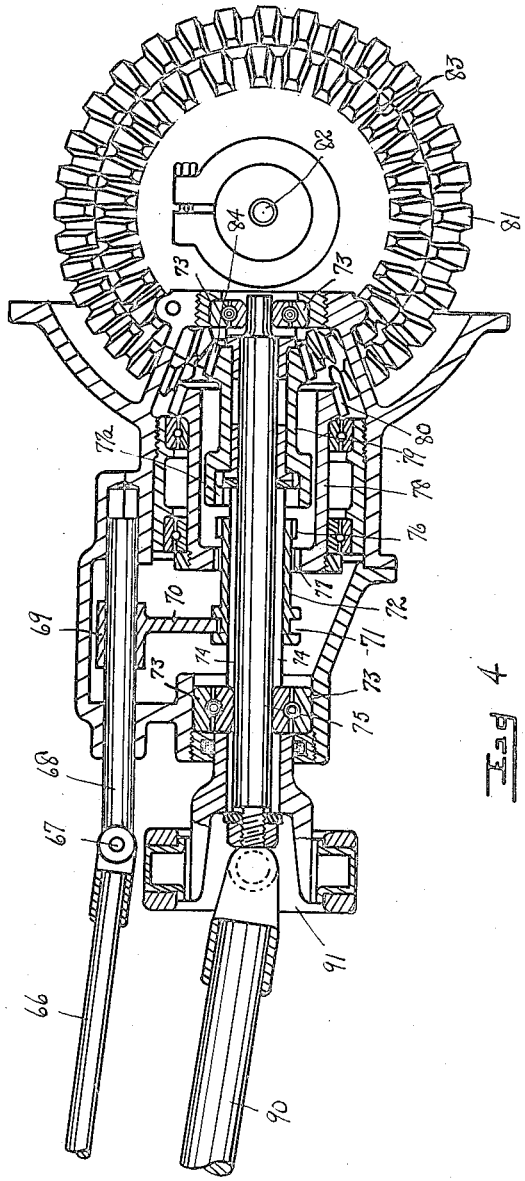

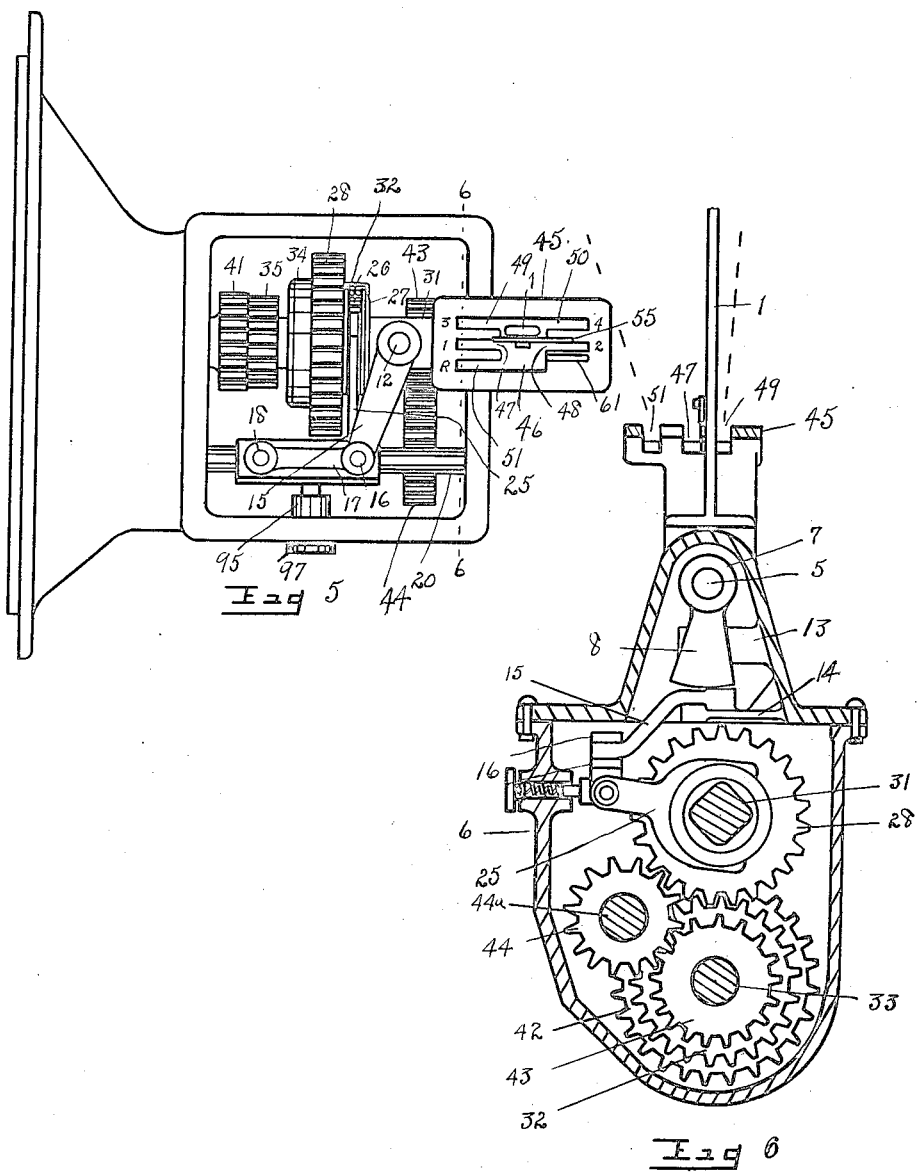

1,449,269

UNITED STATES PATENT OFFICE.

EDWARD D. CRONK, OF UTICA, NEW YORK.

SINGLE-LEVER CONTROL FOR SHIFTING AUTOMOBILE SPEED MECHANISM.

Application filed November 29, 1919. Serial No. 341,351.

*To all whom it may concern:*

Be it known that I, EDWARD D. CRONK, a citizen of the United States, residing at Utica, in the county of Oneida and State of New York, have invented certain new and useful Improvements in Single-Lever Controls for Shifting Automobile Speed Mechanism, of which the following is a specification, reference being had therein to the accompanying drawing.

My invention relates to a single lever control for shifting automobile speed mechanism, and I declare the following to be a full, clear, concise, and exact description thereof sufficient to enable anyone skilled in the art to which it appertains to make and use the same, reference being had to the accompanying drawings in which like reference characters refer to like parts throughout the specification.

The object of the invention is to provide a single lever control for actuating a multiple speed transmission in conjunction with a two speed rear axle of an automobile, whereby to effect, as in this instance, four speeds forward and one reverse of the automobile.

The mechanism herein shown provides a direct drive through the transmission when the automobile is traveling in the two high-set speeds forward, whereby to reduce friction to a minimum and, thereby, eliminate the loss of power as well as to lessen the noise incident to driving through transmission gears.

The object will appear by referring to the drawings, in which:

Fig. 1 is an elevational view of the transmission, showing the casing in section; and the members connecting said transmission with the rear axle transmission broken away;

Fig. 2 is a detail view of the upper part of the shift lever employed;

Fig. 3 is a detail view enlarged showing a fragment of the casing and adjacent parts in section;

Fig. 4 is a vertical section of the rear axle gear mechanism;

Fig. 5 is a plan view of the transmission, showing the upper part of the casing removed;

Fig. 6 is a section taken on the line 6—6 of Fig. 5;

Referring more particularly to the drawings, the shift lever is represented by—1— and is fulcrumed upon a shaft 2 that has bearings in a block 3. The block 3 is equipped with journals 4 and 5 that have rotative bearings in the casing 6. The journal 5 projects through the sleeve portion 7 of a rock sector gear 8. The sleeve section 7 is fastened to rock with the journal 5. The extending or depending part of the sector gear 8 has beveled teeth 9 that mesh with the corresponding teeth of a beveled pinion 10, fixed to revolve with a shaft 12 having bearings in the brackets 13 and 14 which extend laterally from the adjacent side of the casing 6. There is fixed to turn also with the shaft 12 an arm 15 whose opposite end is pivotally connected to the bifurcated ends 16—16 of the link 17. The link 17 is fulcrumed at 18 to the sleeve 19 adapted to slide along the shaft 20 carried in bearings in the casing 6.

The sleeve 19 has rigidly fastened thereto a yoke 25 whose free ends rest in an annular groove 26 formed in the flange part 27 of the spur gear 28 that is mounted to revolve with the square main transmission shaft 31 having bearings in the blocks 31ª—31ª resting in the casing 6. Moreover, the gear 28 is adapted to slide longitudinally on the square shaft 31, whereby it can be actuated into or out of mesh with the spur gear 32 fastened to revolve with the auxiliary shaft 33 carried to revolve freely in bearings 33ª—33ª resting in the casing 6, in order to transmit from the crank shaft, when in mesh, a slower motion of revolution to the square shaft 31.

The gear 28 has formed integral therewith an internal gear clutch 34 adapted to move in and out of mesh with the mating part 35 of the gear clutch which is integral with gear 41 mounted to turn with the shaft 40 connected to the crank shaft, not shown, of the engine by a clutch, not shown, and independent of the shaft 31. The meshing of the gear clutch 34 with its mating part 35 effects a direct drive from the crank shaft to the engine, shaft 40 and shaft 31 to the rear axle hereinafter described.

The auxiliary shaft 33 is compelled to revolve constantly in unison with the shaft 40 by means of the spur gears 41 and 42 which are fastened to revolve with the shaft 40 and auxiliary shaft 33 respectively. Gear 41 is of smaller diameter than gear 42, whereby the speed of revolution of the auxiliary shaft 33 is slower than that of shaft 40.

The auxiliary shaft 33 has fastened thereto also, whereby to revolve therewith a spur gear 43 that meshes with an intermediate spur gear 44 adapted to revolve loosely upon an arbor 44ª carried by the casing 6. The spur gear 28 is designed to be moved longitudinally into mesh with the intermediate gear 44, whereby to reverse the direction of rotation of the shaft 31 to back the automobile.

The spur gear 28 is actuated longitudinally along the square shaft 31 by the lateral movement of the shift lever —1— as indicated by dotted lines in Fig. 6. The shift lever —1— is guided in this lateral movement by the plate 45 which is provided with a central recess 46 for the purpose. Recesses 47, 48, 49, 50 and 51 leading off from recess 46 guide the fore and aft movement of the lever —1—. Or in other words, when the lever —1— is moved laterally to a position opposite the recesses 47 and 48 it will rock the block 3, journals 4 and 5, and sector gear 8, which in turn will rotate the beveled pinion 10, to thereby actuate the arm 15 connected to the link 17, pivoted to the sleeve 19, whereby to move the sleeve 19 longitudinally upon the shaft 20. Inasmuch, however as the sleeve 19 carries the yoke 25 that embraces the annular groove 26 formed in the flange 27 of the spur gear 28, said gear 28 will be moved therewith into mesh with the spur gear 32.

On the other hand should the shift lever —1— be moved laterally to a position opposite recesses 49 and 50, the movement of the several parts heretofore enumerated would be reversed and gear 28 moved in the opposite direction past neutral position, whereby the internal gear clutch 34 would mesh with its mating part 35 of gear 41 fastened to the shaft 40. This engaging of the clutch would effect a direct drive through the transmission to the rear axle.

Furthermore, the shift lever —1— is equipped with a pawl 55 that is fulcrumed thereto and rocked upon its fulcrum by a rod 57. The upper end of the rod 57 projects through a guide sleeve formed integral with the lever —1— and has a thumb piece 58, whereby pressure exerted thereon will depress the rod 57 against the tension of the spring 56, rock the pawl 55 and elevate the detent or tooth 60 of said pawl 55 free of the lug 61 formed integral with the upper surface of the plate 45 adjacent the recess 48 to thereby permit the lever —1— to rock therepast and come opposite the recess 51. In this position of lever —1— the gear 28 will mesh with the gear 44 to effect a reverse rotation of the shaft 3 whereby to move the automobile backwards.

It will be apparent, therefore, that the gears of the transmission provide two different speeds forward and one speed reverse. The speeds forward being effected by the meshing of the gear clutch 34 with its mating part 35 and the lower speed by the gear 28 meshing with the gear 32. The reverse speed will be effected by the gear 28 meshing with the intermediate gear 44, which meshes with the gear 43.

The lever —1— is stopped temporarily in each of the three positions named above by a plunger 90 that is adapted to engage in turn each of the three recesses 91–92–93 formed in the sleeve 19, whereby to temporarily hold the gear 28 in mesh respectively with gear 32 or 44 or the clutch 34 in mesh with its mating part 35. The plunger 90 is mounted to slide in a housing 95 formed in the casing 6. A coiled spring 96 bears against the plunger 90 at one end and against the removable cap 97 at the other, and is adapted to press the plunger 90 normally against the sleeve 19, whereby it will engage the several recesses, 91–92–93, as they come opposite. The cap 97 is screw threaded to the housing 95.

The lever —1— is adapted also to actuate the gear mechanism of any well known two speed rear axle mechanism, such as now to be described and for this purpose has a part 65 extending below its fulcrum, which part is pivotally connected to a rod 66 that is fulcrumed at 67 to a rod 68 united at 69 to a yoke 70, the free ends of which engage an annular recess 71 in the movable clutch 72.

The clutch 72 has keyways oppositely disposed that engage splines 74—74 formed on the shaft 75, whereby said clutch will revolve with the shaft 75 and, yet, be permitted to move longitudinally therealong. The shaft 75 is mounted to revolve freely in bearings 73. Clutch 72 has also gear teeth 76 adapted to move into and out of mesh with the internal gear 77 formed on the end of sleeve 78 mounted to revolve independently of the shaft 75. A beveled pinion 80 is made integral with the sleeve 78 and is adapted to mesh with the bevel gear 81 fixed to revolve with the rear axle or drive shaft 82 of the automobile.

Beveled gear 83 is attached to revolve with the gear 81 and meshes with the beveled pinion 84 that is formed integral with the sleeve 79, whereby the drive can be effected through the sleeve 79 when the clutch teeth 76 are engaged with teeth 77ª of the sleeve 79 which is integral with pinion 84.

The shaft 75 is connected to revolve with the shaft 31 by a rod 90ª united to shaft 75 and shaft 31 by universal joints 91ª—91ª of any well known construction.

The ratio of beveled pinion 80 and gear 81 is less than the ratio of beveled pinion 84 and beveled gear 83, whereby the speed of revolution of the driven or rear axle 82 will be faster when the drive is through the pinion 80 and the gear 81 than when it is through the pinion 84 and gear 83.

The operation of the lever —1— and control mechanism, whereby to shift the several sets of gears and clutches in both transmission and rear axle to effect four speeds forward of the automobile and one reverse is briefly described as follows:

Assuming that the gear 28 of the transmission is in the position illustrated in Fig. 1 and that the chauffeur desires to start the automobile forward. It may be stated, however, that the gear 28 will be moved so as to be always in mesh with either the gear 32 or 44 or else moved, whereby the clutch 34 will mesh with its mating part 35. The position of the gear 28 illustrated in Fig. 5 indicates the gear 28 and clutch 34 approaching the mating part 35 of the clutch just after the gear 28 has been withdrawn from mesh with the gear 32. The chauffeur will push first on the foot pedal, not shown, whereby to disengage the crank shaft, not shown, of the engine from the shaft 40 and, thereby, stop the rotation of the transmission mechanism. Thereafter, the chauffeur will move the lever —1— laterally opposite the recesses 47 and 48, whereby to effect a meshing of the gear 28 with the gear 32 and, then, into recess 47 to effect an engagement of the clutch teeth 76 with the teeth 77ª, so as to drive through the bevel pinion 84 and gear 83 of the rear axle. The foot pedal will thereupon be released, whereby the shaft 40 will begin to revolve with the crank shaft of the engine. The revolving of the shaft 40 will be transmitted to the square shaft 31 through the train of gears 41, 42, 32 and 28, whereby to effect the first speed forward of the automobile. Each successive movement of the lever —1— like the first is preceded by pushing on the foot pedal, not shown, to throw out the crank shaft clutch, not shown.

If the shift-lever —1— is moved directly across the recess 46 into the recess 48 the extending part 65 of the lever —1— will actuate the link 66 to thereby operate the clutch 72 to free the teeth 76 from the clutch teeth 77ª and to engage teeth 76 with teeth 77, whereby the drive will be through the beveled pinion 80 and beveled gear 81 in order to effect the second speed forward of the automobile.

The third speed forward is attained by again actuating the foot pedal, not shown, drawing the lever —1— out of recess 48 into the recess 46 and then, moving the same laterally opposite recesses 49 and 50 and into recess 49. The movement of the lever —1— out of recess 48 will actuate the clutch 72 to effect a drive through the beveled pinion 84 and beveled gear 83 in place of the drive through pinion 80 and gear 81 of higher speed and the movement laterally of the shift lever —1— to the position opposite the recesses 49 and 50 will disengage the gear 28 from the gear 32 and engage the internal gear clutch 34 with its mating part 35, thereby effecting the third highest speed forward of the automobile.

If the lever —1— is moved now into recess 50 which lies directly opposite, the clutch 72 will be actuated again to re-establish the drive through the beveled pinion 80 and beveled gear 81, whereby to effect the fourth or highest speed forward of the automobile.

In order to reverse the rotation of the transmission shaft 31 to back the automobile, the operator, after pushing on the foot pedal, not shown, actuates the lever —1— back into recess 46 and, then, moves it laterally at the same time pressing down on the thumb piece 58, whereby to rock the pawl 55 upon its fulcrum to allow the tooth 60 to clear the lug 61 and the pawl and lever —1— to move therepast. This lateral movement of the lever —1— will cause the gear 28 to engage the intermediate gear 44 which meshes with the gear 43, whereby to reverse the direction of rotation of the shaft 31. By now moving the lever —1— into recess 51, the clutch 72 will be actuated to cause a drive through the beveled pinion 84 and beveled gear 83 which will give a backward motion to the automobile.

In the lateral movements of the lever —1—, the same will be temporarily halted in any one of the three positions, whereby the gear 28 will be in mesh with gear 32 or 44 or the clutch 34 in mesh with its mating part 35, by the engagement of the plunger 90 with the respective apertures 91, 92, or 93 formed in the side of the sleeve 19 mounted to slide upon the stationary shaft 20.

The plate 45 has marked thereon the numerals 1, 2, 3, 4 and the letter "R," whereby to indicate the position of the lever —1— at the different speeds forward and reverse of the automobile.

Having thus described my invention what I declare as new and desire to secure by Letters Patent is:

1. In a single lever control for shifting automobile speed mechanism, having gears and clutches, a lever fulcrumed on a shaft having bearings in a rock block, journals for supporting said block, a rock sector gear fastened to one of said journals, a pinion in mesh with said sector gear, means connecting said pinion with said sliding gear, whereby rocking of the lever in a lateral direction will change the positions of said sliding gear, and means permitting said lever to rock in a direction transverse to the first mentioned direction, whereby to change the positions of the clutches to increase or decrease the speed of the automobile.

2. In a single lever control for shifting automobile speed mechanism, having gears and clutches, a lever fulcrumed intermediately of its length, a shaft for supporting said lever in a rock block, trunnions for supporting said rock block, a rock sector gear fastened to one of said trunnions, a pinion in mesh with said sector gear, an arm and link connecting said pinion gear with a movable sleeve, a yoke mounted to said sleeve and adapted to engage one of said first mentioned gears, whereby the movement of said lever will move said gear to vary the speed of the automobile, and rods connecting said lever with said clutches, whereby to also vary the speed of the automobile.

3. In a single lever control for shifting automobile speed mechanism having gears and clutches, a lever fulcrumed upon a shaft having bearings in a block, trunnions for supporting said block in a revolvable manner, means connecting said block with one of said gears, means, whereby the movement of said lever will move one of said gears, whereby to vary the speed of the automobile, bars connecting said lever with said clutches, and means whereby the movement of said lever transverse to said first named movement will move said clutches to also vary the speed of the automobile.

4. In a single lever control for shifting automobile speed mechanism having gears and clutches, a lever fulcrumed upon a shaft having bearings in a block, trunnions for supporting said block in a revolvable manner, means connecting said block with one of said gears, whereby the movement of said lever will move said gear, means for temporarily halting said gear in any one of three positions, and rods connecting said lever with said clutches, whereby the movement of said lever transverse to its first named movement will move said clutches to vary the speed of the automobile.

5. In a single lever control for shifting automobile speed mechanism having gears and clutches, a lever fulcrumed intermediate of its length, trunnions supporting said fulcrum, an arm having a sector gear adapted to rock with one of said trunnions, a pinion in mesh with said sector gear, an arm and link connecting said pinion with a movable sleeve, a shaft for supporting said sleeve in a sliding manner, a spring pressed plunger for holding said shaft in given positions, temporarily, a yoke connected with said sleeve for moving one of said gears, whereby to change the speed of the automobile, and rods connecting the lower part of said lever, whereby to move said clutches to change the speed of the automobile.

6. In a single lever control for shifting automobile speed mechanism having gears and clutches, a lever fulcrumed intermediately of its length, upon a shaft supported by a rock block, trunnions for carrying said block, an arm having a sector gear adapted to rock with said trunnions, a pinion in mesh with said sector gear, an arm and link connecting said pinion with a movable sleeve, a shaft for supporting said sleeve in a sliding manner, a spring pressed plunger for holding said shaft temporarily in given positions, a yoke connected to said sleeve and adapted to engage one of the first mentioned gears, rods connecting the lower end of said lever with said clutches, whereby a given movement of said lever will effect a movement of said clutches to change the speed of the automobile, and means limiting the movement of said lever.

7. In a single lever control for shifting automobile speed mechanism having gears and clutches, a lever fulcrumed upon a shaft having bearings in a block, trunnions for supporting said block in a revolvable manner, means connecting said trunnions with a movable sleeve, a shaft for supporting said sleeve in a sliding manner, a plunger for holding said shaft temporarily in any one of three positions, a yoke connected with said sleeve and adapted to engage a gear, whereby the movement of said lever will move said gear to change the speed of the automobile, forward, and to reverse the movement of said automobile, a spring pressed rod attached to said lever, and a lug adapted to limit the movements of said lever.

In testimony whereof I have affixed my signature.

EDWARD D. CRONK.